(12) United States Patent
Villwock et al.

(10) Patent No.: US 7,590,427 B2
(45) Date of Patent: Sep. 15, 2009

(54) METHOD AND APPARATUS FOR ALLOCATING AT LEAST ONE PARAMETER TO AT LEAST ONE TRANSMISSION CHANNEL

(75) Inventors: Christian Villwock, Grossbeeren (DE); Peter Pille, Berlin (DE); Patrice Richard, Berlin (DE)

(73) Assignee: Tektronix, Inc., Beaverton, OR (US)

( * ) Notice: Subject to any disclaimer, the term of this patent is extended or adjusted under 35 U.S.C. 154(b) by 451 days.

(21) Appl. No.: 11/327,127

(22) Filed: Jan. 5, 2006

(65) Prior Publication Data

US 2006/0194599 A1 Aug. 31, 2006

(30) Foreign Application Priority Data

Jan. 5, 2005 (EP) ................... 05000141

(51) Int. Cl.
*H04B 7/00* (2006.01)
(52) U.S. Cl. ...................... 455/509; 455/450
(58) Field of Classification Search ................. 455/509, 455/450; 370/350, 528
See application file for complete search history.

(56) References Cited

U.S. PATENT DOCUMENTS 5,715,245 A 2/1998 Suonvieri

2002/0181439 A1* 12/2002 Orihashi et al. ............. 370/350
2003/0100299 A1 5/2003 Ko
2007/0097926 A1* 5/2007 Liu et al. .................... 370/335

* cited by examiner

*Primary Examiner*—Sam Bhattacharya
(74) *Attorney, Agent, or Firm*—Michael J. Fogarty, III; Matthew D. Rabdau

(57) ABSTRACT

The present invention relates to a method for allocating at least one parameter to at least one transmission channel at an interface disposed between a first node and a second node of a transmission system, wherein the interface is connected to at least one link disposed between the first node and the second node, comprising: a) evaluating the control plane data for determining that a user plane connection including at least one transmission channel for user plane data is to be activated, and determining the associated at least one parameter; b) determining, which at least one transmission channel for user plane data changes its state from inactive to active within a presettable period of time; and c) allocating the at least one parameter to the at least one transmission channel for user plane data. Moreover, it relates to a corresponding apparatus for allocating at least one parameter to at least one transmission channel at an interface disposed between a first node and a second node of a transmission system.

19 Claims, 5 Drawing Sheets

METHOD AND APPARATUS FOR ALLOCATING AT LEAST ONE PARAMETER TO AT LEAST ONE TRANSMISSION CHANNEL

BACKGROUND

The present invention relates to mobile radio networks and more specifically to methods and systems for allocating parameters at an interface to their respective transmission channels.

According to a prior network standard known under the designation GSM, a radio frequency is occupied by a subscriber, and only allocated to this subscriber. This frequency is occupied by the subscriber as long as communication is maintained regardless of speaking pauses which may occur, and independently of the performances and services purchased by the subscriber from an associated provider. Since radio frequencies are a resource, which is scarce and not readily reproducible, this state has been deemed to be capable of improvement. After this system of so-called second generation, a system of 2.5th generation followed, the so-called GPRS, as a representative of the third generation, the EDGE network follows. Through the two last-mentioned generations, a multiple number of subscribers are serviceable compared to the GSM network. The available channels are more efficiently distributed, for example, with low speech activity, a lower capacity is required. Moreover, the capacity can be varied depending on the purchased performances and services.

For describing the problematic nature of prior solutions, first, reference is made to FIG. 1. FIG. 1 first shows five nodes of a mobile radio network, namely the GGSN (Gateway GPRS Support Node), SGSN (Serving GPRS Support Node), BSC (Base Station Controller), BTS (Base Transceiver Station) and MS (Mobile System). Between these nodes, various interfaces are disposed: between the MS and the BTS, the Um interface, between the BTS and the BSC, the Abis interface, between the BSC and the SGSN, the Gb interface, between the SGSN and the GGSN, the Gn interface, and between the GGSN and the MSC (not shown), the Gi interface. The nodes and interfaces between the MS and the SGSN are referred to as GERAN (GSM EDGE Radio Access Network), both for mobile radio networks with GSM, GPRS and EDGE technology. BSC, Abis interface and BTS are combined in a BSS (Base Station Sub-System), wherein a BSC is able to service a plurality of BTS. So-called BSS are sold as a unit by manufacturers, whereby the Abis interface is formed proprietarily according specific manufacturers' definition rather than standardized. In contrast to this, the Um and the Gb interface are standardized. Within a BSS, usually the respective BTS are designed to be cost-effective by providing only limited processing capacity. It is located in the respective BSC. Monitoring the Abis interface is desirable since many parameters relevant to the air interface (Um) are transmitted there. Monitoring these parameters is not possible at the Gb interface since they are no longer present there. With respect to FIG. 1, for example, this is the case for the parameter PCU (Packet Control Unit), which is used for transmitting useful data. In practice, the physical connection between a BTS and a BSC is realized by multiple PCM (Pulse Code Modulation) connections, especially 1 to 4 E1/DS1 lines. Each one of these lines is composed of 32 (E1) or 24 (DS1) channels. Each transmission channel transmits data with a rate of 64 kbits/s. The channels can be divided into sub-channels with data rates of 8 kbits/s, 16 kbits/s or 32 kbits/s.

A transmission channel between BTS and BSC serves for transmitting control plane data. The position of this transmission channel has to be known for monitoring. For determining the position of this transmission channel, for example, the method can find application, that the applicant of the present application has described in the patent application with the publication number 20050030903 entitled "Determining a transmission parameter in a transmission system", the content of which is incorporated herein by reference. Control plane data is transmitted for establishing and terminating, i.e., for activating and deactivating, a user plane connection (speech or data) on the transmission channel for control plane data, which contains information about the transmission channel for user plane data. As already mentioned, this information relating to the user plane connection may be specific to each manufacturer. Some manufacturers for example use indices to specify transmission channels for user plane data. Others explicitly specify the transmission channel, the transmission sub-channel and the bandwidth. The correlation between these parameters on the one hand and the transmission channels for a user plane connection on the other hand may be stored within the BSC as an allocation table. For example, the allocation table may be transmitted by the BSC to a BTS only once, during initialization phase of the BTS.

For monitoring or analyzing user plane connections, a protocol monitor connected to all of the physical connections between BSC and BTS, requires the correlation information which may be contained in the allocation table. Since, normally, it is impossible, difficult, or otherwise undesirable to perform a reset at the BTS to initiate the retransmission of the content of the allocation table, the previous solution is to manually transmit the content of the allocation table to the protocol monitor.

FIG. 2 shows the just described correlation, according to which control plane data (control plane) and user plane data (user plane) are transmitted over at least one physical connection. The control plane data especially includes data for establishing a connection for transmitting user plane data as well as for controlling the data transmission. The data transmitted on the user plane can especially be circuit switched speech or packet switched data according to the GPRS and EDGE standard. In block 10, the control plane data is evaluated to determine at least one parameter allocated to at least one transmission channel. With this parameter, information is found, for example, by means of the allocation table 12, which allows the protocol monitor to open at least one transmission channel, on which user plane data is transmitted, see block 14. However, the approach known from the prior art, suffers from the disadvantage that for manual transmission of the allocation table to the protocol monitor, expert knowledge is required, which typically is not available to a technician installing a protocol monitor. The experts currently entrusted with this task are highly qualified experts and therefore, their operation is associated with high cost.

SUMMARY

Embodiments of the present invention relate to methods for allocating at least one parameter to at least one transmission channel at an interface disposed between a first and a second node of a transmission system, wherein the interface is connected to at least one link disposed between the first and the second node, wherein plural transmission channels are established on the at least one link, wherein control plane data is transmitted over at least one of the transmission channels, which includes the at least one parameter, and this transmission channel is known, and wherein user plane data is transmitted on at least one of the transmission channels, wherein the at least one parameter is allocated to at least one transmission channel, on which user plane data is transmitted. Moreover, a corresponding apparatus for allocating at least one parameter to at least one transmission channel of an interface disposed between a first and a second node of a transmission system is also provided.

Although the present invention will be described by way of example of the Abis interface, which connects a base transceiver station (BTS) to a base station controller (BSC), the invention can of course also be applied in networks of another standard, especially mobile radio networks of future standards.

For clarification, in the present description, the term "link" means the physical connection between the first and the second node. This physical connection may include wireless connections. "Transmission channel" relates to the division of the transmission on a link into related frames. A user plane connection may include one or more transmission channels, wherein the transmission in transmission sub-channels is also possible, i.e., different users can share one transmission channel. In the following, the term "transmission channel" uniformly used due to the easier understanding, also includes plural transmission channels as well as "transmission sub-channels". A parameter contains information about transmission-relevant information concerning a transmission channel. This one can be combined in a single parameter, for example an index, however it can also be composed of multiple individual parameters containing this information.

The present method, and apparatus, is based on the recognition that the above objects can be solved if the control plane data transmitted on the transmission channel for control plane data is evaluated and is skillfully related to operations on transmission channels for user plane data. Especially, the invention relies on evaluation of the control plane data to determine that user plane connection including at least one transmission channel for user plane data is to be activated, wherein the associated at least one parameter is determined. Subsequently, it is determined which of the at least one transmission channel for user plane data has changed its state from inactive to active within a presettable period of time, for example 20 ms. Finally, the at least one parameter is allocated to the at least one transmission channel for user plane data.

If only one single transmission channel changes its state from inactive to active within the preset time frame, the protocol monitor knows the correlation between the respective transmission channel for user plane data and the at least one parameter, for example the above designated index. However, if plural transmission channels change their state from inactive to active within the presettable time frame, no final decision can be made. Therefore, a preferred development is characterized in that the control plane data is evaluated in order to determine that a user plane connection is to be deactivated. Subsequently, it is determined, which at least one transmission channel of the transmission channels, which had changed their state from inactive to active within the presettable period of time, has changed its state from active to inactive within a second presettable period of time. Finally, the at least one parameter is allocated to the at least one transmission channel, which has changed its state from active to inactive within the second presettable period of time.

A preferred embodiment is characterized in that the at least one parameter and the at least one transmission channel are entered into an allocation table, especially in a storage device. Thereby, the possibility is provided that the protocol monitor "learns" the entire content of the allocation table by simply monitoring all of the activities on the links between a BTS and a BSC. This learning operation is particularly effective if prior to evaluating the control plane data the allocation table is checked to confirm whether the parameter is already entered, and the remaining steps of the present method are only performed for the parameters not yet acquired in the allocation table.

Preferably, the at least one parameter includes a selection of the following information: location of the transmission channel, bandwidth, or location of the transmission sub-channel.

Since information can be combined in the at least one parameter, for example encoded in an index, as mentioned, or the at least one parameter can include multiple parameters containing the corresponding information relevant to transmission of the user plane data, in an embodiment of the present method the basic proprietary structure of the at least one parameter is known.

Since the transmission can also for example occur in plural transmission sub-channels allocated to a user plane connection, which can be located in different transmission channels, in an embodiment of the present method, the data transmitted on the at least one link is divided in transmission channels with the smallest bandwidth used between the first and the second node for transmission.

As far as applicable, the advantages mentioned in the context of the method according to the invention also apply to the apparatus according to the invention.

Aspects of the various embodiments of the present invention will become apparent from the following detailed description when read in conjunction with appended claims and attached drawings.

DETAILED DESCRIPTION

Figure 1:
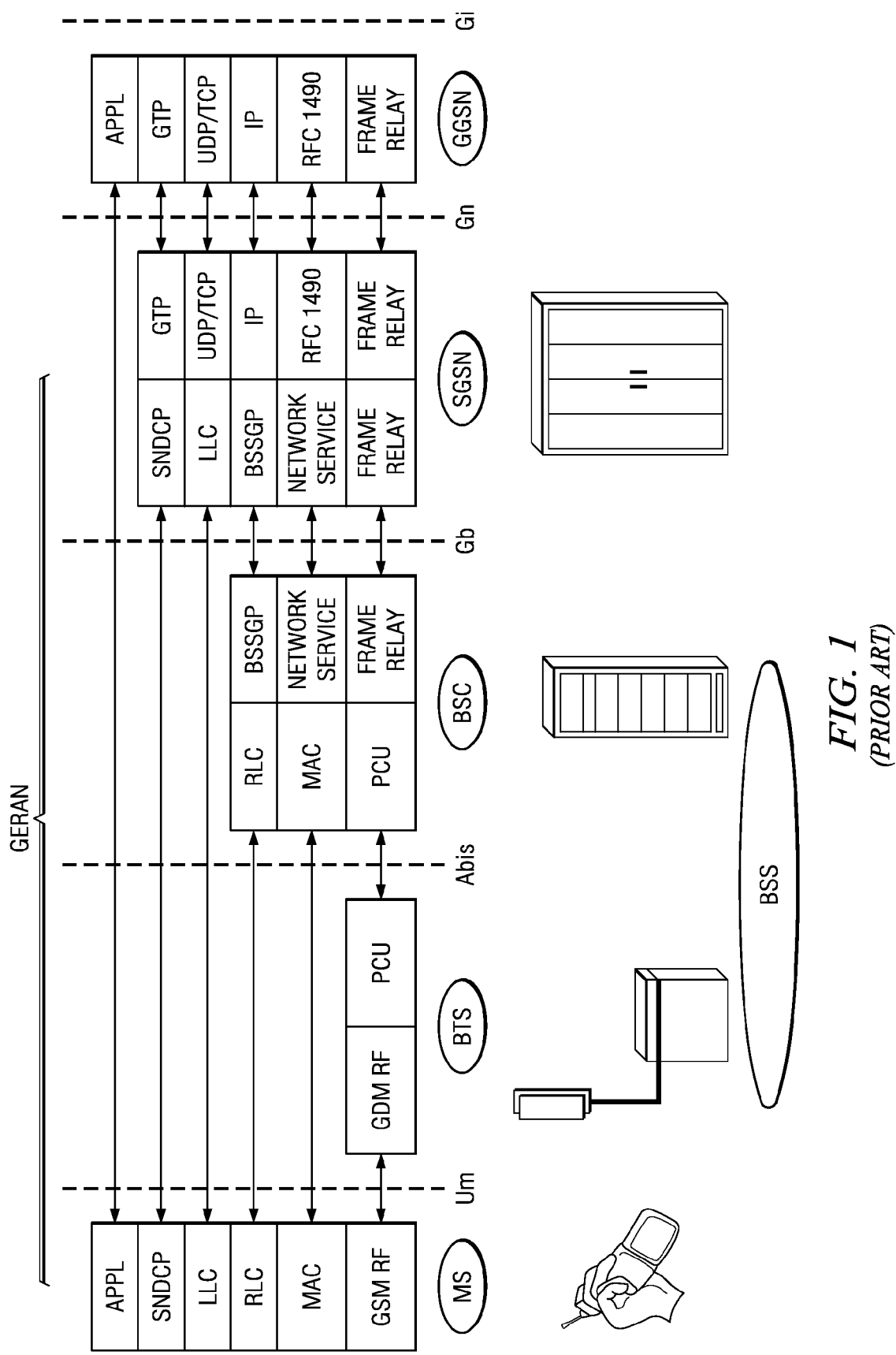
FIG. 1 (prior art) shows a segment with plural nodes and plural interfaces of a mobile radio network in a GSM/GPRS/EDGE environment as is known from the prior art.
Figure 2:
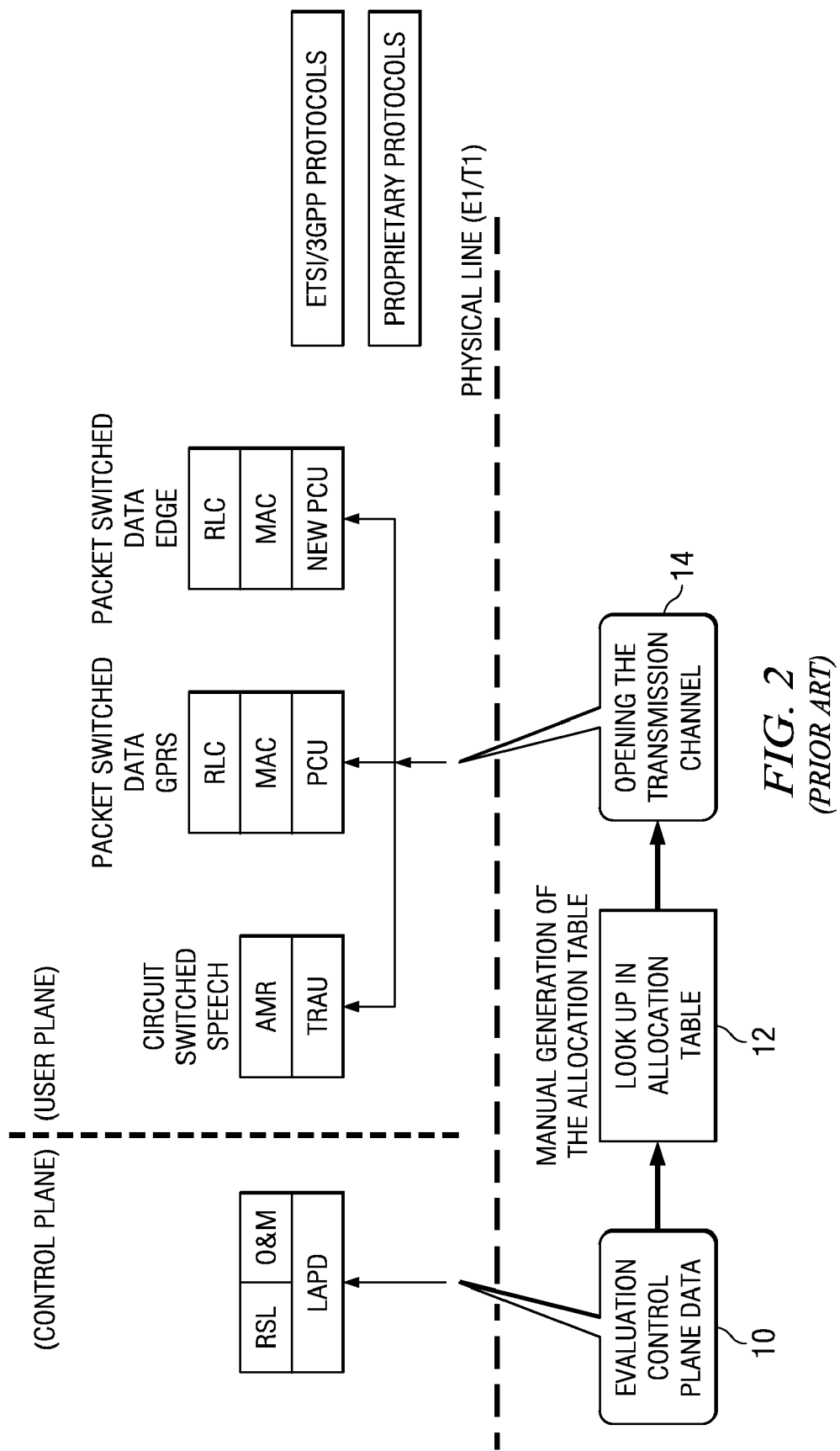
FIG. 2 (prior art) is a schematic representation of an approach for monitoring a transmission channel, on which user plane data is transmitted, as is known from the prior art.
Figure 3:
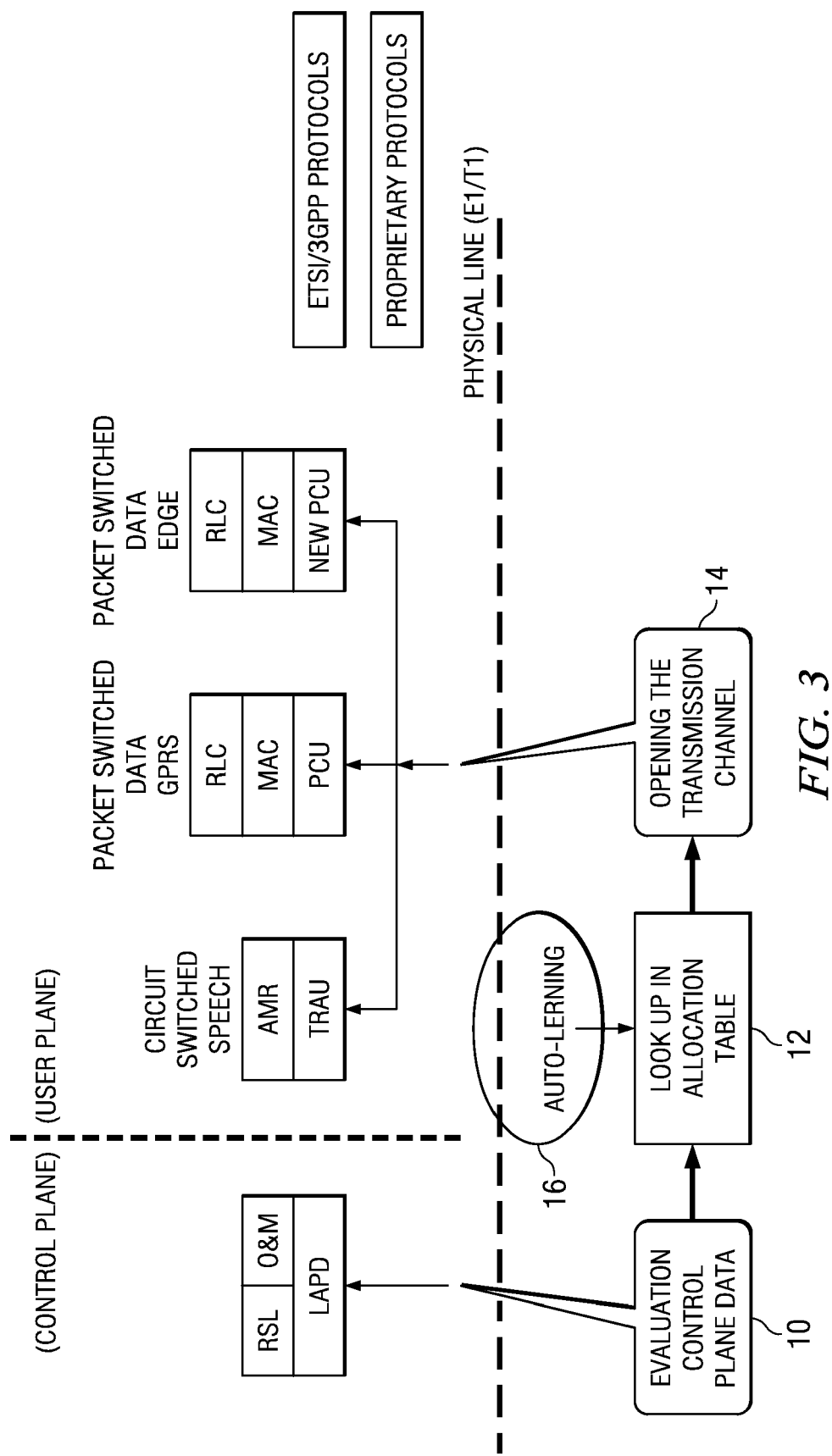
FIG. 3 is a schematic representation of an approach for monitoring a transmission channel, on which user plane data is transmitted according to the present method.
Figure 4:
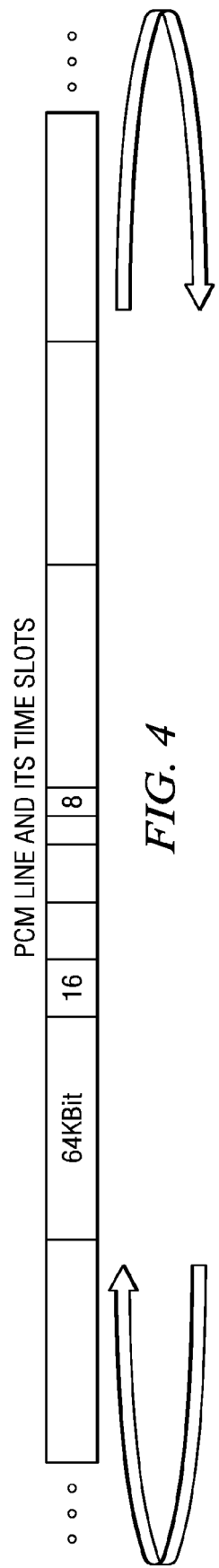
FIG. 4 illustrates a single link with its time slots, i.e., with its transmission channels and transmission sub-channels.

A comparison of FIGS. 2 and 3 makes clear the location at which the present method intervenes. An allocation table 12 is generated by an "auto-learning" process 16 in the method according to the invention. As already mentioned, between a BTS and a BSC, between one and four PCM links, so-called E1 or DS1 lines, can be present. For example, a transmission channel has a bandwidth of 64 kbits/s, however, a division in transmission sub-channels with a data rate of 32 kbits/s, 16 kbits/s or 8 kbits/s is also possible. This is illustrated in FIG. 4. The arrows are to express that all of the time slots, i.e., all of the transmission channels and transmission sub-channels, are continuously scanned on all of the connected PCM lines (wrap around) in the present method. If it is known that the manufacturer of the respective BSS uses a certain time slot format, the scanning process can be restricted to time slots having the corresponding bandwidth. For each time slot, there is an entry in the respective allocation table. The present method now has the object to find out the at least one parameter to each time slot, which is transmitted on the transmission channel for control plane data, when the respective time slot is to be activated or deactivated.

Figure 5:
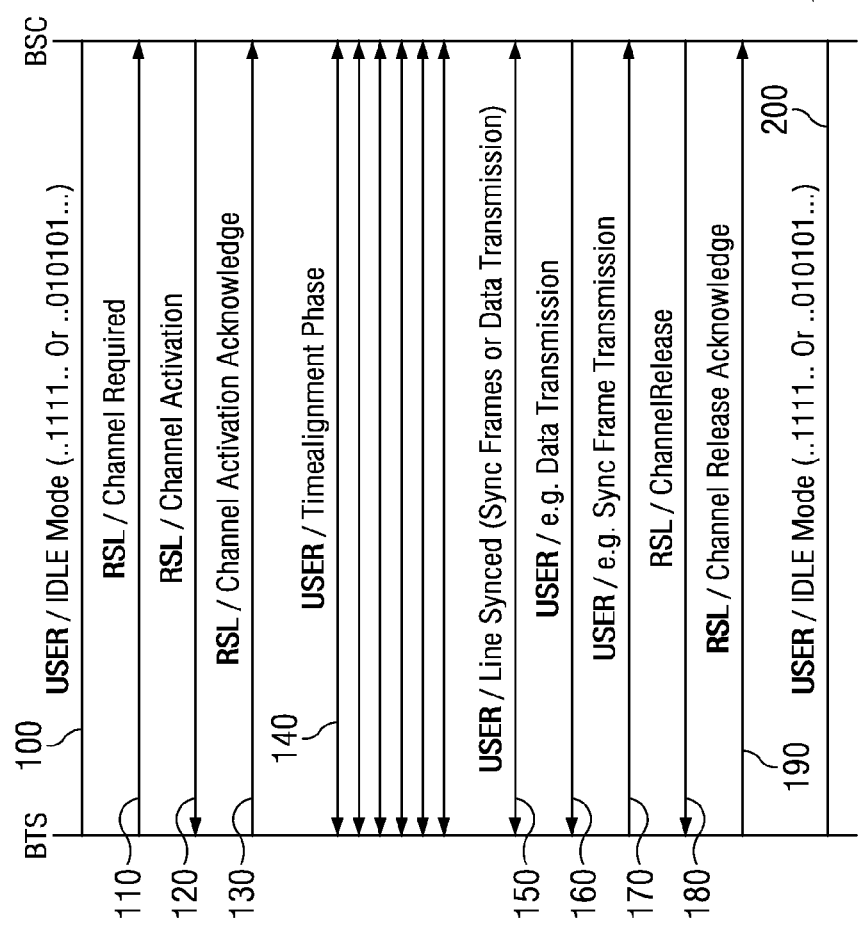
FIG. 5 illustrates the timing flow in activating and deactivating a user plane connection.

FIG. 5 shows the approach in activating and deactivating a time slot, below referred to as transmission channel without limitation with respect to the bandwidth, between a BTS and a BSC. In the representation of FIG. 5, transmissions made over the one transmission channel, on which control plane data is transmitted, are designated by RSL (radio signaling link), whereas transmissions on a transmission channel for user plane data are designated by USER. First, at least one transmission channel is in the IDLE mode, i.e., in idle operation. This is apparent in simple manner in that a fixed pattern is transmitted, for example only ones or alternatively zero and one (step 100). In step 110, the BTS signals that a user plane connection is to be established, and requests at least one transmission channel for user plane data from the BSC. In step 120, the BSC transmits the release for activating a transmission channel and transmits herein also the at least one parameter containing information to the at least one transmission channel. In step 130, the BTS acknowledges the message transmitted in step 120. In step 140, at least one transmission channel for user plane data goes to the activated state. The change of state is apparent in that now another bit sequence is transmitted instead of the idle mode signal, see step 100. Starting from the idle mode, first, a time alignment is made to synchronize the BSC with the air interface. Empirically determined, this takes between 80 ms and 1000 ms. In step 150, i.e., after the time alignment, the transmission channel is synchronized for the transmission of user plane data and continuously transmits synchronizing frames or data frames, compare also steps 160 and 170. In step 180, one of the two subscribers to the mobile communication hangs up. On the transmission channel for control plane data, a signal is transmitted indicating a channel release. In the present case, the channel release is sent from the BSC to the BTS. The BTS acknowledges this channel release in step 190. Subsequently, in step 200, the transmission channel for user plane data again goes to idle mode.

Figure 6:
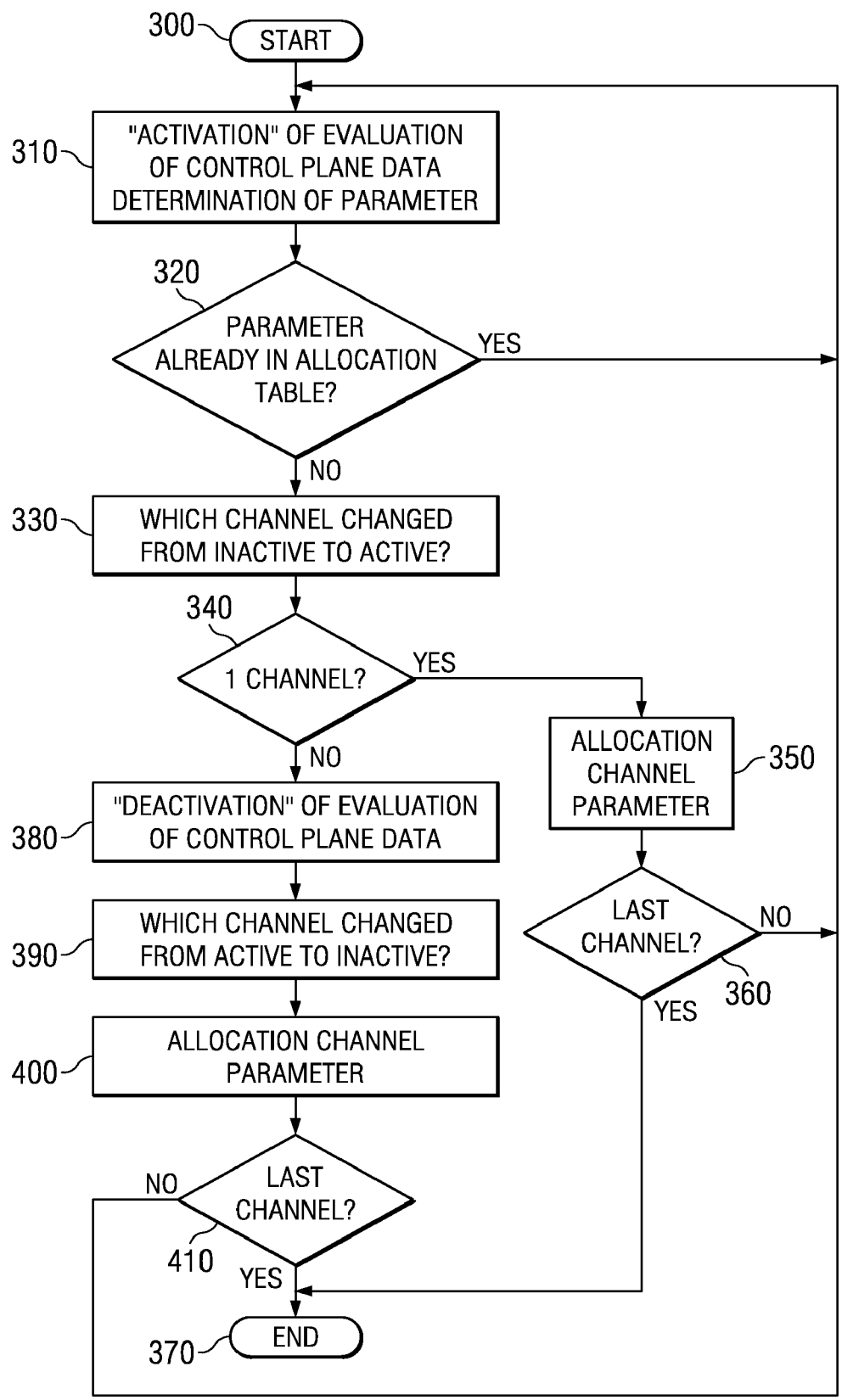
FIG. 6 is a flowchart relating to a preferred embodiment of the present method.

According to FIG. 6, the method according to the invention starts in step 300. In step 310, the control plane data is evaluated to determine that a user plane connection including at least one transmission channel for user plane data is to be activated. At the same time, the associated at least one parameter is determined. In step 320, it is checked to confirm if the parameter has already been acquired, for example in the allocation table. If so, the method branches back to step 310. If not, subsequently, in step 330, it is determined which transmission channel for user plane data has changed its state from inactive to active within a presettable period of time. If it is determined in step 340 that only one single transmission channel has changed its state from inactive to active, i.e., that only one transmission channel has exited the idle mode, the parameter determined in step 310 is allocated to this one transmission channel in step 350. In step 360, it is checked if this was the last transmission channel, which does not yet have a parameter allocated for it. If not, the method branches back to step 310. However, if this was the last channel, the method is terminated in step 370. If it is determined in step 340 that plural channels have changed their state from inactive to active within the presettable period of time, thus, in step 380, the control plane data is evaluated to determine that a user plane connection is to be deactivated. In step 390, it is determined which at least one transmission channel of the transmission channels, which had changed their state from inactive to active within the presettable period of time, see step 330, changes its state from active to inactive within a second presettable period of time. The presettable time periods may be the same, or different. In step 400, the parameter determined in step 310 is allocated to the transmission channel, which has changed its state from active to inactive within the second presettable period of time, see step 390. In step 410, it is again checked, if this was the last transmission channel, which has not yet a parameter allocated. If so, the method is terminated in step 370, otherwise, the method branches back to step 310.

The following is to be noted: Since the data actually transmitted over a transmission channel for user plane data is irrelevant to the structure of the allocation table, the data transmitted in steps 150 to 170, see FIG. 5, can be discarded. This results in only a comprehensible number of data having to be stored and evaluated in order to perform the present method. As a result, this results in the present method being realizable in real time. The period of time between transmission of the parameter on the transmission channel for control plane data and associated change of state of a transmission channel is 20 ms to 500 ms, preferably 20 ms to 100 ms. When determining the at least one parameter, the information transmitted on the transmission channel for control plane data is continuously completely decoded. Upon change of state, the concerned time slot, the associated time stamp as well as the type of change of state, i.e., from active to inactive or vice versa, are preferably stored.

It will be obvious to those having skill in the art that many changes may be made to the details of the above-described embodiments of this invention without departing from the underlying principles thereof. The scope of the present invention should, therefore, be determined only by the following claims.

What is claimed is:

1. A method for allocating at least one parameter to at least one transmission channel at an interface disposed between a first node and a second node of a transmission system, wherein the interface is connected to at least one link disposed between the first node and the second node, comprising
   a) evaluating control plane data for determining that a user plane connection including at least one transmission channel for user plane data is to be activated, and determining the associated at least one parameter;
   b) determining, which at least one transmission channel for user plane data changes its state from inactive to active within a presettable period of time; and
   c) allocating the at least one parameter to the at least one transmission channel for user plane data.

2. The method according to claim 1, further comprising:
   d1) evaluating the control plane data for determining that a user plane connection is to be deactivated;
   d2) determining, which at least one transmission channel of the transmission channels, which had changed their state from inactive to active within the presettable period of time, changes its state from active to inactive within a second presettable period of time; and
   d3) allocating the at least one parameter to the at least one transmission channel, which has changed its state from active to inactive within the second presettable period of time.

3. The method according to claim 2, further comprising entering the at least one parameter and the at least one transmission channel in an allocation table.

4. The method according to claim 3, wherein after performing step a), the allocation table is checked to determine whether the parameter is already entered in the allocation table, and the remaining steps are only performed for the parameters that are not yet acquired in the allocation table.

5. The method according to claim 4, wherein the at least one parameter includes a location of a transmission channel, a bandwidth, or a location of a transmission sub-channel.

6. The method according to claim 5, wherein the basic structure of the at least one parameter is known.

7. The method according to claim 6, wherein prior to performing step b), the data transmitted on the at least one link is divided in transmission channels with the smallest bandwidth used between the first (BTS) and the second (BSC) node for transmission.

8. The method according to claim 1, further comprising entering the at least one parameter and the at least one transmission channel in an allocation table.

9. The method according to claim 8, wherein after performing step a), the allocation table is checked to determine whether the parameter is already entered in the allocation table, and the remaining steps are only performed for the parameters that are not yet acquired in the allocation table.

10. The method according to claim 1, wherein the first node is a base station (BTS) and the second node is a base station controller (BSC).

11. The method according to claim 1, wherein the first node and the second node are connected to each other through one to four PCM links (E1/T1).

12. The method according to claim 1, wherein the at least one parameter includes a location of a transmission channel, a bandwidth, or a location of a transmission sub-channel.

13. The method according to claim 1, wherein the basic structure of the at least one parameter is known.

14. The method according to claim 1, wherein prior to performing step b), the data transmitted on the at least one link is divided in transmission channels with the smallest bandwidth used between the first (BTS) and the second (BSC) node for transmission.

15. An apparatus for allocating at least one parameter to at least one transmission channel at an interface disposed between a first node and a second node of a transmission system, wherein the interface is connected to at least one link disposed between the first node and the second node, comprising:

a device for evaluating control plane data, which is configured to determine that a user plane connection including at least one transmission channel for user plane data, is to be activated, and to determine the associated at least one parameter;

a device for determining, which at least one transmission channel for user plane data changes its state from inactive to active within a presettable period of time; and a device for allocating the at least one parameter to the at least one transmission channel for user plane data.

16. The apparatus according to claim 15, wherein the interface is an Abis interface, the first node is a BTS node and the second node is a BSC node.

17. The apparatus according to claim 15, further comprising a device for determining, which at least one transmission channel for user data changes its state from active to inactive with a second presettable period of time.

18. A method for associating at least one data parameter to at least one transmission channel, the at least one transmission channel disposed between a first node and a second node of a transmission system, comprising:

a) evaluating control plane data to determine that at least one transmission channel for user plane data is to be activated, wherein the control plane data is associated with the at least one parameter;

b) identifying one or more transmission channels for user plane data that change state from inactive to active within a first presettable period of time; and c) associating the at least one parameter to the one or more transmission channels that change state from inactive to active within the first presettable period of time.

19. The method according to claim 18, further comprising:

d1) evaluating the control plane data to determine that a user plane connection is to be deactivated;

d2) identifying which of the one or more transmission channels that changed state from inactive to active within the first presettable period of time also change state from active to inactive within a second presettable period of time; and d3) allocating the at least one parameter to one or more transmission channels that change state from active to inactive within the second presettable period of time.

* * * * *